(12) United States Patent
Aboujaib et al.

(10) Patent No.: US 9,719,603 B2
(45) Date of Patent: Aug. 1, 2017

(54) SHUT-OFF ROTARY VALVE, PARTICULARLY FOR GAS TURBINE

(71) Applicant: GE ENERGY PRODUCTS FRANCE SNC, Belfort (FR)

(72) Inventors: Mohamad-Maher Aboujaib, Belfort (FR); Daniel Deloge, Belfort (FR)

(73) Assignee: GE ENERGY PRODUCTS FRANCE SNC, Belfort (FR)

( * ) Notice: Subject to any disclaimer, the term of this patent is extended or adjusted under 35 U.S.C. 154(b) by 0 days.

(21) Appl. No.: 14/647,668

(22) PCT Filed: Nov. 27, 2013

(86) PCT No.: PCT/EP2013/074901
§ 371 (c)(1),
(2) Date: May 27, 2015

(87) PCT Pub. No.: WO2014/083075
PCT Pub. Date: Jun. 5, 2014

(65) Prior Publication Data
US 2015/0308577 A1    Oct. 29, 2015

(30) Foreign Application Priority Data
Nov. 27, 2012    (FR) ..................... 12 61281

(51) Int. Cl.
*F16K 11/087*    (2006.01)
*F16K 5/06*    (2006.01)
*F01D 17/10*    (2006.01)

(52) U.S. Cl.
CPC .......... *F16K 11/0873* (2013.01); *F01D 17/10* (2013.01); *F16K 5/0605* (2013.01); *F05D 2220/32* (2013.01)

(58) Field of Classification Search
USPC ............ 137/625.11, 625.16, 625.19, 625.41, 137/625.47
See application file for complete search history.

(56) References Cited

U.S. PATENT DOCUMENTS 2,921,604 A * 1/1960 Zettl ................... F16K 11/0856
137/625.43
3,166,098 A * 1/1965 Jennings ............. F16K 11/0873
137/625.43
(Continued)

FOREIGN PATENT DOCUMENTS

DE    19533899 A1    3/1997
EP    0329477 A1    8/1989
(Continued)

OTHER PUBLICATIONS

A PCT Search Report and Written Opinion issued in connection with corresponding PCT Application No. PCT/EP2013/074901 on Jan. 2, 2014.

*Primary Examiner* — John Fox
(74) *Attorney, Agent, or Firm* — GE Global Patent Operation; Douglas D. Zhang

(57) ABSTRACT

A valve for use in a gas turbine. The valve includes at least one valve body, at least first, second and third fluid delivery pipes positioned on the valve body, at least one outlet pipe positioned on the valve body and a rotatable spherical shutter inside the valve body (and including first and second distribution channels formed within the shutter so as to allow the outlet pipe to be selectively connected to one of the delivery pipes during rotation of the shutter.

14 Claims, 6 Drawing Sheets

(56) References Cited

U.S. PATENT DOCUMENTS

| | | | |
|---|---|---|---|
| 5,375,622 A * | 12/1994 | Houston | F16K 11/076 137/240 |
| 5,529,758 A * | 6/1996 | Houston | F16K 11/0853 137/312 |
| 6,438,963 B1 | 8/2002 | Traver et al. | |
| 6,918,255 B2 | 7/2005 | Kaplan et al. | |
| 2005/0009788 A1 | 1/2005 | Lockwood et al. | |
| 2008/0000353 A1* | 1/2008 | Rarig | B01D 53/0446 95/100 |
| 2011/0139281 A1 | 6/2011 | Bassmann et al. | |
| 2011/0277480 A1 | 11/2011 | Aboujaib et al. | |

FOREIGN PATENT DOCUMENTS

| | | |
|---|---|---|
| EP | 0715105 A1 | 6/1996 |
| EP | 1872845 A1 | 1/2008 |
| FR | 1362887 A | 6/1964 |
| FR | 2938048 A1 | 5/2010 |
| GB | 2190014 A | 11/1987 |

\* cited by examiner

SHUT-OFF ROTARY VALVE, PARTICULARLY FOR GAS TURBINE

BACKGROUND OF THE INVENTION

Embodiments of the present invention relate to the field of gas turbines. In particular, embodiments of the present invention relates to valves for use in the fuel supply systems of such turbines.

The fuel systems of the industrial gas turbines burn a mixture of fuels, such as oxygen and a gas or liquid fuel. These multi-fuel gas turbines generally do not simultaneously use liquid and gaseous fuels, but are alternately supplied with one fuel and then another. Changeover of the fuel supply is typically time-consuming and following such a change in fuel, the supply of that fuel is fixed until a subsequent changeover.

In such multi-fuel gas turbines, stagnant liquid fuel can undergo solidification at high temperatures and in the presence of air. This phenomenon is known as "coking". This solidification may result in deterioration of sensitive elements of the turbine and of the sealing function of mechanical components, such as valves and check valves. It may also give rise to a reduction of fuel flow speeds in the turbine.

In order to resolve these disadvantages, it is known to remove residual liquid fuel in the supply system through a drain by admitting pressurized air. This drainage function is intended to clean the supply system, particularly in high temperature areas close to the turbine. However, this drainage function has limited efficiency. In fact, since the pressurized air used is compressible, variations in the flow of liquid fuel towards the turbine fuel chamber can occur during drainage. This can result in power trips. Moreover, this drainage can also cause accumulation of air in the supply system, which can also result in power trips. These power trips are problematic in that they can trigger overspeed or high temperature alarms at the exhaust of the turbine.

In an attempt to resolve these problems, residual liquid fuel has firstly been drained by passing pressurized water through the liquid fuel supply system and then, the water drained by introducing pressurized air. Such an approach is described in FR-A1-2 938 048

The fuel system includes check valves provided within the liquid fuel supply circuit and on the purge air inlet circuit which are positioned close to the fuel chambers of the turbine. The proximity of these valves to high temperature areas of the turbine may result in a deterioration of the spring tension associated with the valves in an open or closed position.

Embodiments of the present invention are aimed at resolving these problems.

More particularly, it is an object of embodiments of the present invention to provide devices that, on the one hand, avoids the presence of residual liquid fuel in the turbine supply system that may form a residue that tends to solidify in the presence of air and at high temperatures, and on the other hand, to increase the reliability of the turbine.

BRIEF DESCRIPTION OF THE INVENTION

Embodiments of the present invention reside in a valve for use in a turbine, including a valve body, at least first, second and third fluid inlet pipes positioned on the valve body, at least one outlet pipe positioned on the valve body, and a rotatable spherical shutter inside the valve body, the shutter including first and second distribution channels such that, in a first position of the shutter, the first distribution channel is configured to allow fluid communication between the first delivery pipe and the outlet pipe, in a second position of the shutter, the first distribution channel is configured to allow fluid communication between the second delivery pipe and the outlet pipe and in a third position of the shutter, the second distribution channel is configured to allow fluid communication between the third delivery pipe and the outlet pipe.

In one embodiment, the first distribution channel includes a cylindrical portion that traverses the shutter for connection of the first delivery pipe and the outlet pipe in the first position of the shutter, and a circumferential portion extending from the cylindrical portion and formed on an external surface of the shutter, for connection of the second delivery pipe and the outlet pipe in the second position of the said shutter.

The first and second distribution channels may be formed on the shutter by machining.

More particularly, the first and the second distribution channels of the shutter are in different areas in order to avoid fluid communication between the channels.

In another embodiment, the valve body includes several outlet pipes, the first and second distribution channels being configured to allow supply to all the outlet pipes.

The shutter may be rotatable about a transverse axis with respect to the delivery pipes and the outlet pipe.

In another embodiment, the valve includes a cooling circuit located inside the valve body and arranged to allow a cooling fluid to flow therein. The cooling circuit may surround the shutter.

In another embodiment, the valve includes at least one evacuation drain extending inside the valve body and terminating at a housing of the valve body, inside of which the shutter is fitted.

The valve body and the shutter may be fabricated from a metal. In one embodiment, the valve body is spherical.

Embodiments of the invention also reside in a supply system for a turbine including at least one combustion chamber configured to be supplied with liquid fuel, the system including of a liquid fuel inlet means, a drain liquid inlet means, a drain gas inlet means and the valve as described above, wherein the first, second and third delivery pipes of the valve are connected to the liquid fuel inlet means, the drain liquid inlet means and the drain gas inlet means respectively.

BRIEF DESCRIPTION OF THE DRAWINGS

Various aspects, advantages and features of the present invention will become apparent from the following detailed description, in conjunction with the drawings identified below, in which.

DETAILED DESCRIPTION OF THE INVENTION

Figure 1:
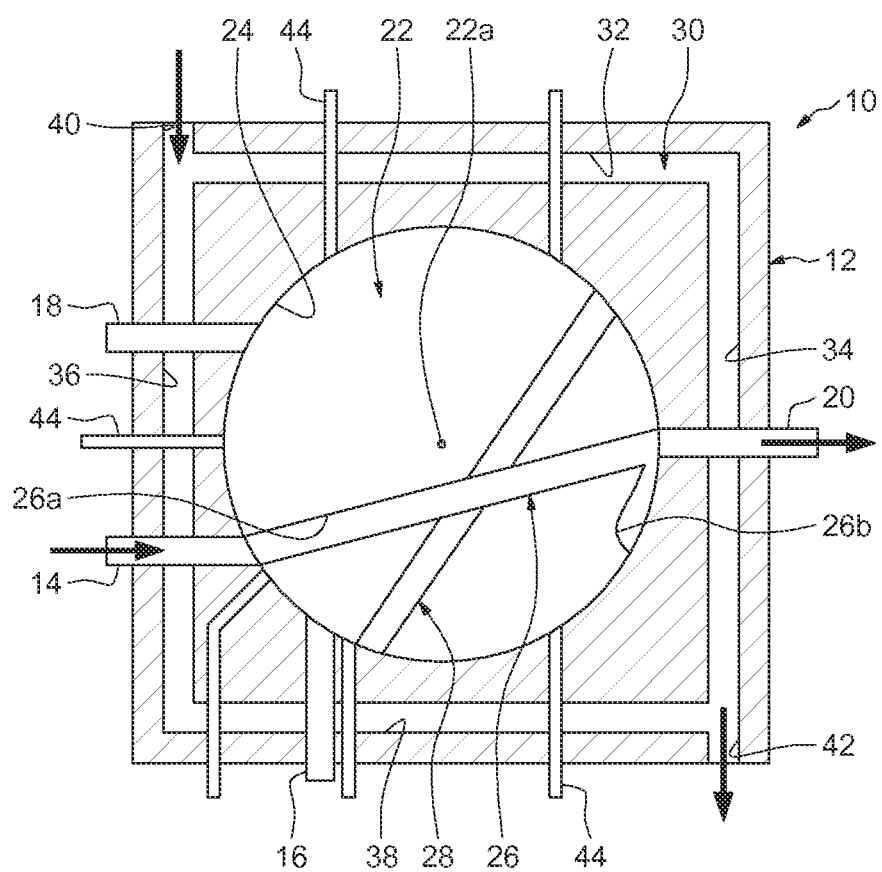
FIGS. 1, 2, and 3 schematically illustrate a valve in three supply positions according to an embodiment of the present invention.
Figure 2:
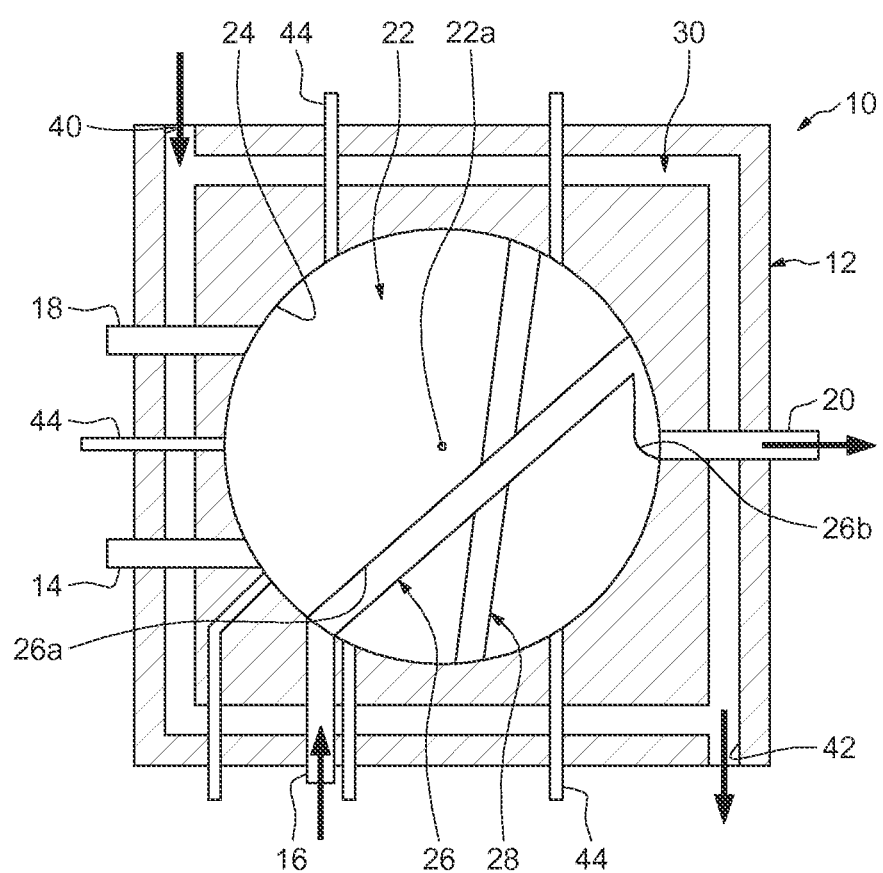
Figure 3:
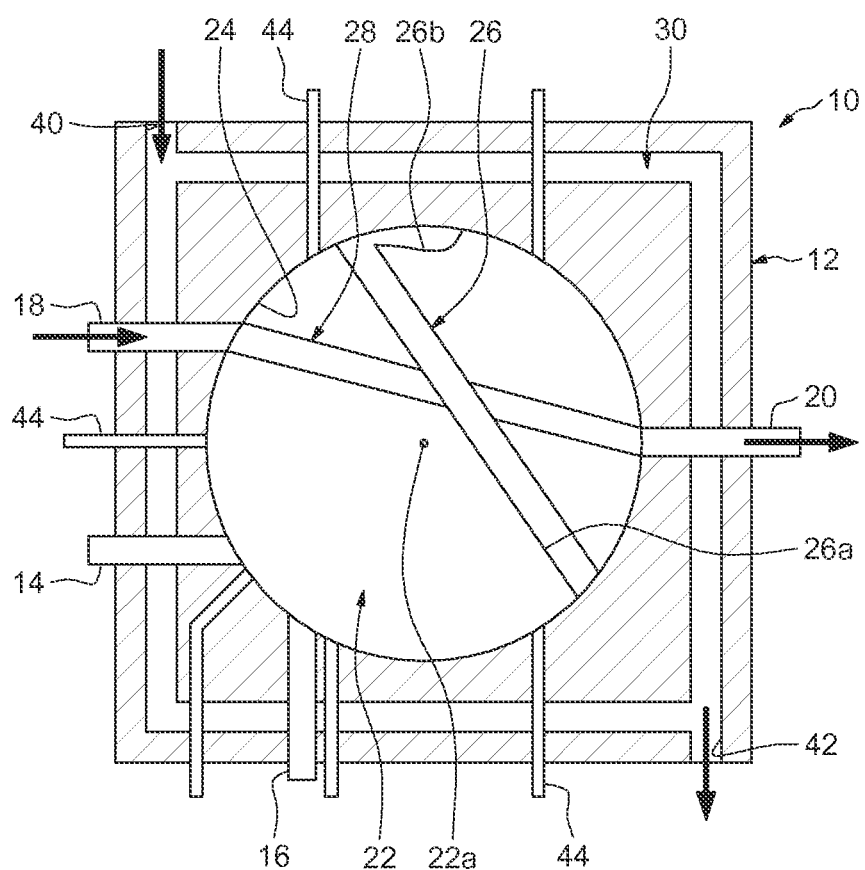

In FIGS. 1 to 3, a valve 10 is shown which is intended for use in a fuel supply system of a gas turbine including one or more fuel chambers that may be supplied with gas or liquid fuel.

The valve 10 includes of a body 12, a delivery pipe 14 configured to be supplied with liquid fuel, a first drain pipe 16 configured to be supplied with a drain liquid, a second drain pipe 18 configured to be supplied with a drain gas, an outlet pipe 20 configured to be connected to one or more fuel chambers of the turbine, and a spherical shutter 22 fitted inside a housing 24 of the valve body. The delivery pipes 14, drain pipes 16, 18 and outlet pipes 20 are individual pipes and are positioned on the valve body 12 and have an open end on the housing 24. In the illustrated embodiment, the valve body 12 has a generally square cross-section but other cross-sections may be used such as, for example, spherical. The valve body 12 and the shutter 22 may be made of metal, which facilitates the formation of a strong seal between these two elements.

As will be described more in detail, the shutter 22 is rotatable relative to the valve body 12 in such a way so as to selectively connect the outlet pipe 20 to the inlet pipe 14 for the supply of a liquid fuel or to one of the drain pipes 16, 18 for the supply of a drain liquid or gas. The shutter 22 is rotatable about a transverse axis 22a with respect to the delivery pipes 14, the drain pipes 16, 18 and the outlet pipe 20.

The shutter 22 includes a distribution channel 26 formed thereon and, as illustrated in FIG. 1, in a first position of the shutter 22 relative to the valve body 12, the distribution channel 26 is configured to allow fluid communication between the delivery pipe 14 and the outlet pipe 20. In this position, the valve 10 allows the supply of liquid fuel to the turbine combustion chambers.

The distribution channel 26 includes a cylindrical portion 26a of constant diameter which traverses the shutter 22 by plugging on either side of the housing 24 of the valve body 12. The cylindrical portion allows connection of the delivery pipe 14 and outlet pipe 20. In this first liquid fuel supply position illustrated in FIG. 1, a first end of the cylindrical portion 26a of the distribution channel has an inlet located at the outlet of the delivery pipe 14 opening to the housing 24, and an outlet located at the inlet of the outlet pipe 20 opening to the housing 24 at a second opposite end of the cylindrical portion 26a. In this position, the liquid fuel from the delivery pipe 14 flows through the cylindrical portion 26a of the distribution channel before flowing into the outlet pipe 20. The distribution channel 26 also includes a circumferential portion 26b, circumferentially extending on an external surface of the shutter 22 at the second end of the cylindrical portion 26a.

As illustrated in FIG. 2, in a second position of the shutter 22 relative to the valve body 12, the distribution channel 26 is configured to connect the drain pipe 16 with the outlet pipe 20. In this position, the valve 10 allows the intake of a drain liquid to the liquid fuel supply system of the turbine, in order to discharge residual liquid fuel from the supply system. To allow fluid communication between the drain pipe 16 and the outlet pipe 20, the inlet of the cylindrical portion 26a of the distribution channel 26 is located at the outlet of the drain pipe 16 opening to the housing 24, and the end of the circumferential portion 26b of the distribution channel is located at the inlet of the outlet pipe 20. In this position, the drain liquid from the drain pipe 16 flows through the cylindrical portion 26a and the circumferential portion 26b of the distribution channel 26, before flowing into the outlet pipe 20.

In this second drain liquid inlet position illustrated in FIG. 2, the shutter 22 has been rotated by a few degrees about the transverse axis 22a in an anti-clockwise direction relative to the first liquid fuel supply position of the shutter 22. The angle of rotation of the circumferential portion 26b of the distribution channel 26 to the second position will depend on the angular positions of the shutter in relation to the delivery pipe 14 and drain pipe 16.

The shutter 22 also includes a second distribution channel 28 that is configured to allow fluid communication between the drain pipe 18 and the outlet pipe 20 in a third position of the shutter relative to the valve body 12 as is illustrated in FIG. 3. In this third position of the shutter 22, the valve 10 allows the intake of drain gas inlet into the liquid fuel supply system in order to discharge residual drain liquid. The distribution channels 26, 28 are separate and can be formed on the shutter 22 by machining.

The distribution channel 28 includes a cylindrical portion of constant diameter traversing the shutter 22, with open ends on either side of the housing 24 of the valve body 12. The distribution channel 28 allows connection of the drain pipe 18 and outlet pipe 20. In this third drain gas supply position illustrated in FIG. 3, the inlet of the distribution channel 28 is located at the outlet of the drain pipe 18, and the outlet of the distribution channel 28 is located at the inlet of the outlet pipe 20. In this third position, the drain gas flows into the drain pipe 18 across the distribution channel 28 before flowing through the outlet pipe 20.

The distribution channel 28 extends inside the shutter 22 in a separate plane to that of the distribution channel 26 so as to avoid any fluid communication between the two channels. Only the outlets of the distribution channels 26, 28 are located in the same plane so that each may be connected to the outlet pipe 20. The drain pipe 18 is located in a different plane to that of the delivery pipe 14 and the drain pipe 16.

The shutter 22 can be activated by an actuator (not shown), for example, an air actuator, to control the positioning of the valves 10 into one of four separate positions, i.e. the first liquid fuel supply position, the second drain liquid supply position, the third drain gas supply position, or a closed position.

The valve 10 includes a cooling circuit 30 positioned inside the valve body 12 and surrounding the shutter 22. A cooling fluid, for example water, circulates inside the circuit 30. The cooling circuit 30 includes four circulation pipes 32 to 38 formed directly within the valve body 12 and interconnected so as to form a square-shaped cooling circuit 30 inside of which is located the shutter 22. An inlet 40 is located on the valve body 12 at the intersection of the pipes 32, 36 and an outlet is located on the valve body 12 at the intersection of the pipes 34, 38. The cooling circuit 30 facilitates cooling of the delivery pipe 14 and the shutter 22 so as to minimize the risk of solidification of liquid fuel inside these two elements.

The valve 10 also includes several evacuation drains 44 positioned on the valve body 12 and open to the housing 24 in order to allow, if necessary, evacuation of the liquid fuel and drain liquid that can flow between the housing 24 and the shutter 22.

In the illustrated embodiment, there are four drains 44 but it should be understood that any number of drains may be provided and the layout of such drains may be different from that illustrated in FIGS. 1 to 3.

Figure 4:
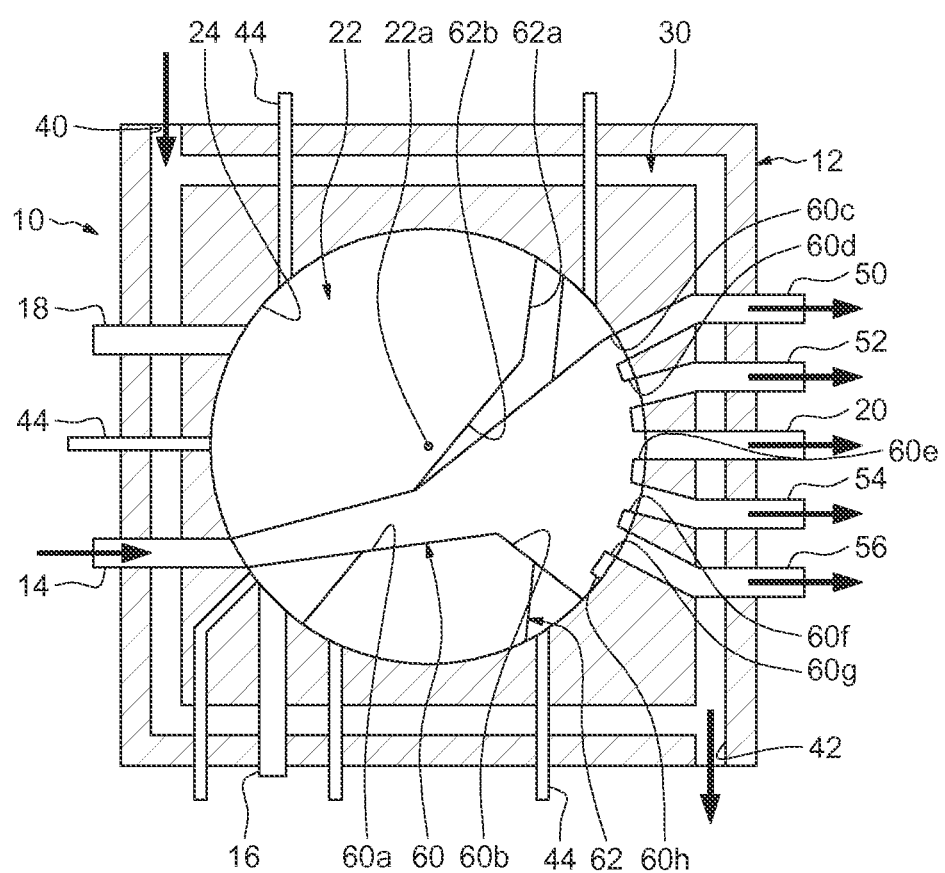
FIGS. 4, 5, and 6 schematically illustrate a valve in three supply positions according to another embodiment of the present invention.
Figure 5:
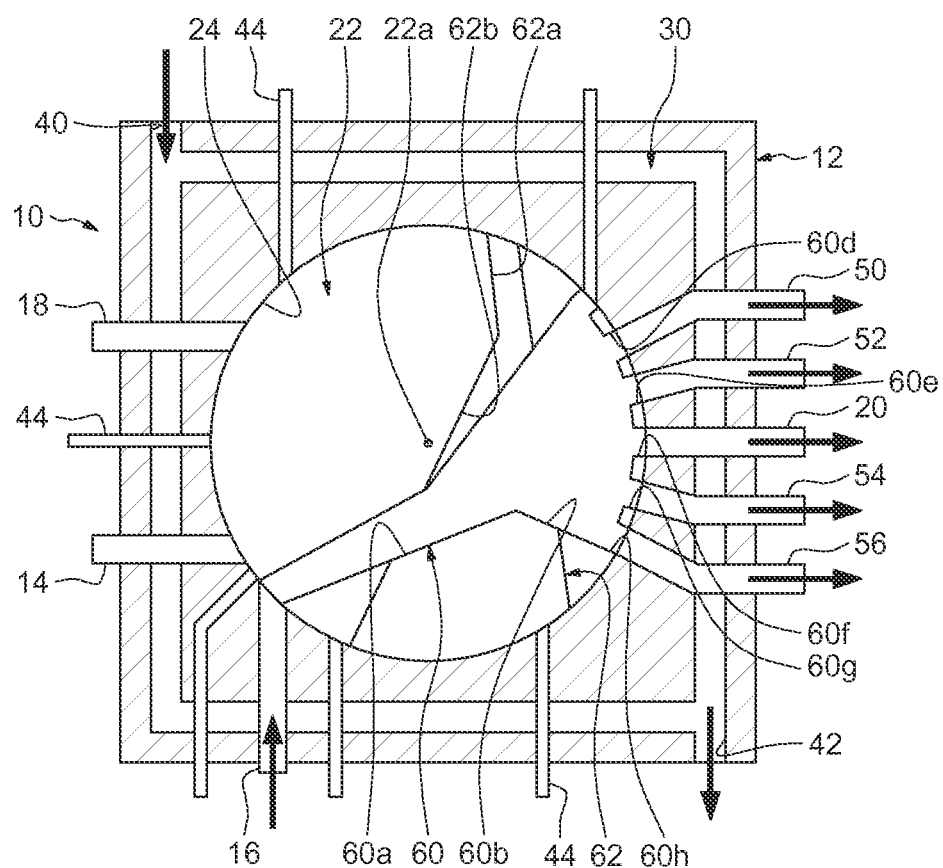
Figure 6:
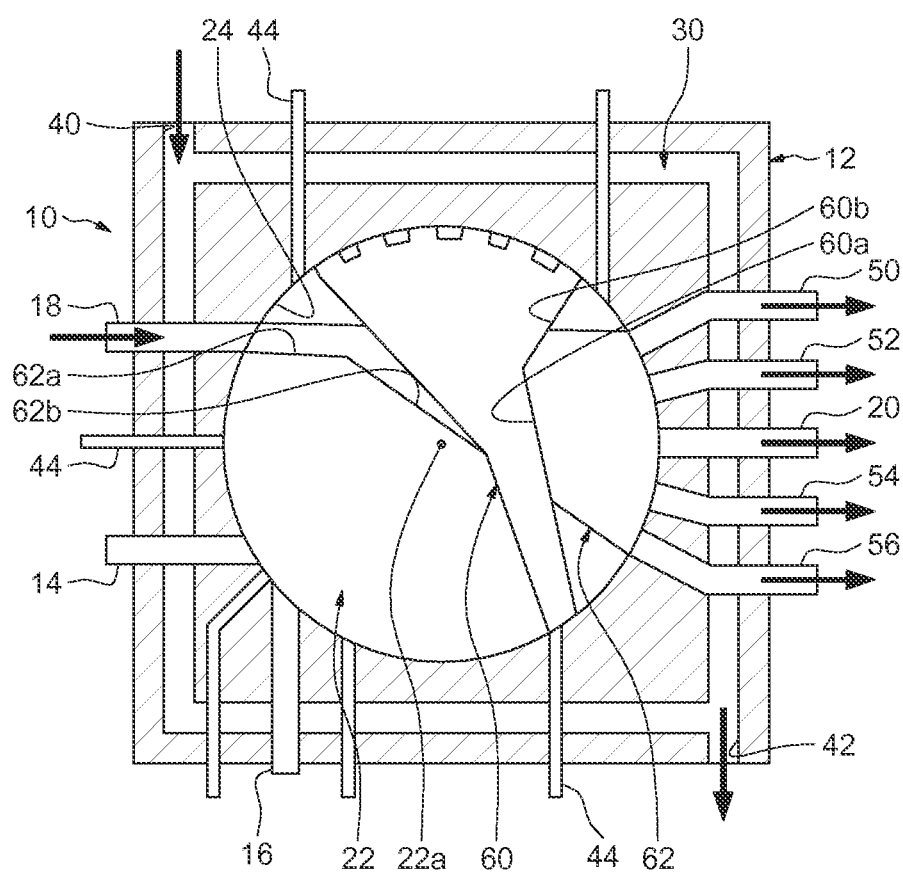

In the embodiment illustrated in FIGS. 4 to 6, in which corresponding elements are identified by the same reference numbers, four additional outlet pipes 50 to 56 are positioned on the valve body 12 and open to the housing 24 of the valve body 12 and are configured to be connected to the turbine combustion chambers.

The shutter 22 includes distribution channels 60, 62 configured to simultaneously supply all the outlet pipes 20 and 50 to 56. Similarly to the previously described embodiment, the distribution channel 60 allows fluid communication between the outlet pipes 20 and 50 to 56 and the delivery pipe 14 or the drain pipe 16. The distribution channel 62 allows fluid communication between the outlet pipes 20 and 50 to 56 and the drain pipe 18. The distribution channels 60, 62 traverse the shutter 22 and has open ends on either side of the housing 24 of the valve body 12. The distribution channel 60 extends inside the shutter 22 in a separate plane to that of the distribution channel 62.

The distribution channel 60 includes of first conical portion 60a of small diameter which extends to a second conical portion 60b of larger diameter that opens out towards the exterior of the valve body 12. Six bypass channels 60c to 60h extend from the end of the second portion 60b. In a first position of the shutter 22 relative to the valve body 12 as illustrated in FIG. 4, an inlet of the first conical portion 60a of the distribution channel 60 is located at the outlet of the delivery pipe 14 and the bypass channels 60c to 60g are located at the inlet of the outlet pipes 20 and 50 to 56 so as to allow liquid fuel to be supplied. In this position, liquid fuel from the delivery pipe 14 flows through the first and second conical portions 60a, 60b and is then directed to the bypass channels 60c to 60g of the distribution channel 60 before flowing through the outlet pipe 20. In a second position of the shutter 22 in relation to the valve body 12 as illustrated in FIG. 5, the inlet of the conical portion 60a of the distribution channel 60 is located at the outlet of the drain pipe 16 and the bypass channels 60d to 60h are located at the inlet of the outlet pipes 20 and 50 to 56 so as to allowing drain liquid to be supplied. In this position, the drain liquid from the drain pipe 16 flows through the first and second conical portions 60a, 60b and is then directed towards the bypass channels 60d to 60h of the distribution channel 60 before flowing through the outlet pipe 20.

The distribution channel 62 includes of a cylindrical portion 62a which extends to a conical portion 62b that opens out towards the exterior of the valve body 12. In a third position of the shutter 22 relative to the valve body 12 as illustrated in FIG. 6, the inlet of the cylindrical portion 62a of the distribution channel 60 is located at the outlet of the drain pipe 18 and the outlet of the conical portion 62b is located at the inlet of the outlet pipes 20 and 50 to 56 allowing drain gas to be supplied. In this position, drain gas from the drain pipe 16 passes through the cylindrical portion 62a and the conical portion 62b of the distribution channel 62 before passing into the outlet pipe 20.

In both of the illustrated embodiments, the valve is described as being used in the liquid fuel supply system of the turbine. Alternatively, the valve may be used in the gaseous fuel supply system of the turbine or in other systems in which at least three different types of fluids are used.

What is claimed is:

1. A valve for use in a turbine, the valve comprising:
   a valve body;
   at least first, second and third fluid delivery pipes positioned on the valve body;
   at least one outlet pipe positioned on the valve body; and
   a rotatable spherical shutter inside the valve body and comprising first and second distribution channels formed on the shutter such that:
      in a first position of the shutter, the first distribution channel is configured to allow fluid communication between the first delivery pipe and the outlet pipe;
      in a second position of the shutter, the first distribution channel is configured to allow fluid communication between the second delivery pipe and the outlet pipe; and
      in a third position of the shutter, the second distribution channel is configured to allow fluid communication between the third delivery pipe and the outlet pipe,
   wherein the first distribution channel of the shutter comprises a first portion that traverses the shutter for connection of the first delivery pipe and the outlet pipe in the first position of the shutter, and a second portion extending from the first portion and positioned on an external surface of the shutter for connection of the second delivery pipe and outlet pipe in the second position of the shutter.

2. The valve according to claim 1, wherein the first portion comprises a cylindrical portion.

3. The valve according to claim 1, wherein the valve body comprises a plurality of outlet pipes, the first and second distribution channels of the shutter being configured to allow supply to all the outlet pipes.

4. The valve according to claim 1, wherein the first and second distribution channels are formed on the shutter by machining.

5. The valve according to claim 1, wherein the first and second distribution channels of the shutter extend in separate planes to each other in order to avoid fluid communication between the channels.

6. The valve according to claim 1, wherein the shutter is rotatable about a transverse axis relative to the delivery pipes and the outlet pipe.

7. The valve according to claim 1, further comprising a cooling circuit located inside the valve body and configured to allow a cooling fluid to flow therein.

8. The valve according to claim 7, wherein the cooling circuit surrounds the shutter.

9. The valve according to claim 1, further comprising at least one evacuation drain extending from inside the valve body with an opening in a housing of the said valve body inside of which the shutter is fitted.

10. The valve according to claim 1, wherein the valve body is spherical.

11. A supply system for a turbine, comprising the valve according to claim 1.

12. The supply system according to claim 11, wherein the first portion comprises a cylindrical portion.

13. The supply system according to claim 11, wherein the second portion comprises a circumferential portion.

14. The valve according to claim 1, wherein the second portion comprises a circumferential portion.

* * * * *